(12) United States Patent
Henry et al.

(10) Patent No.: US 6,405,665 B1
(45) Date of Patent: Jun. 18, 2002

(54) LOW DISTURBANCE FURROWING, SEEDING, AND FERTILIZING TOOL

(75) Inventors: James Wayne Henry, Saskatoon; Gerry Steven Swab, Rosthern; David Wieb, Warman, all of (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/712,929

(22) Filed: Nov. 16, 2000

(51) Int. Cl.$^7$ ................................................ A01C 5/06

(52) U.S. Cl. ...................................... 111/152; 111/124

(58) Field of Search ............................. 111/8, 118, 119, 111/124, 7.4, 14, 130, 133, 149, 150, 152; 172/724, 726

(56) References Cited

U.S. PATENT DOCUMENTS

| | | | |
|---|---|---|---|
| 4,674,419 A | | 6/1987 | Kopecky |
| 4,770,112 A | * | 9/1988 | Neumeyer ..................... 111/73 |
| 4,773,340 A | * | 9/1988 | Williams et al. ................. 111/7 |
| 5,025,736 A | | 6/1991 | Anderson |
| 5,033,398 A | * | 7/1991 | Froc .............................. 111/7 |
| 5,136,954 A | * | 8/1992 | Fetaz et al. ................... 111/123 |
| 5,314,029 A | * | 5/1994 | Rowlett ....................... 172/699 |
| 5,351,635 A | * | 10/1994 | Hulicsko .................... 111/135 |
| 5,452,673 A | * | 9/1995 | Bruce ......................... 111/119 |
| 5,537,942 A | | 7/1996 | Wickstrom |
| 5,983,813 A | * | 11/1999 | Swab et al. ................. 111/150 |

FOREIGN PATENT DOCUMENTS

| | | |
|---|---|---|
| CA | 1237948 | 6/1988 |
| CA | 1271667 | 7/1990 |
| CA | 1271668 | 7/1990 |

OTHER PUBLICATIONS

B. Strautman, "Spread Tip Separates Seed Row—Makes High Fertilizer Rates Safe", Farming, pp. 10–11 (Mar., 2000).

V. Hofman, et al., "Reduced Tillage Seeding Equipment for Small Grains", NDSU Extension Service, North Dakota State University, Fargo,ND, AE–826 (Revised), pp. 1–12 (Sep., 1988).

"Evaluation Report 569–Vern Seed Boot and Banding Knife", Prairie Agriculture Machinery Institute, P.O. Box 1900, Humboldt, Saskatchewan, Canada S0K 2A0 (Mar, 1988).

(List continued on next page.)

Primary Examiner—Robert E. Pezzuto
(74) Attorney, Agent, or Firm—Larry W. Miller; John William Stader (57) ABSTRACT

A furrowing tool for an agricultural planter is formed in a modular configuration to provide for paired row seeding operation. The furrowing tool includes a seedbed furrowing member having an edge lying in a flat cutting plane to form a substantially flat seedbed as the furrowing tool is drawn through ground and a fertilizer furrowing member extending below the cutting plane to form an indentation in the seedbed. The seedbed furrowing member is formed with an upper surface extending rearwardly from the edge and with a void between the upper surface and the cutting plane. The furrowing tool further includes a forwardly and downwardly directed fertilizer dispensing passage to direct a stream of fertilizer at a forward direction into the indentation formed in the seed bed. The stream of seeds is also directed forwardly onto the seedbed through the void formed between the upper surface and the cutting plane. A spreader can be provided to divide the seed stream into a pair of laterally opposing streams onto the seedbed. The seedbed furrowing member and the spreader can be formed as a modular component separate from the fertilizer furrowing member.

15 Claims, 9 Drawing Sheets

OTHER PUBLICATIONS

"Evaluation Report 721–Testing of Double Shoot Openers", Prairie Agricultural Machinery Institute, P.O. Box 1900, Humboldt, Saskatchewan, Canada S0K 2A0 (Oct., 1995).

Dutch Industries Product Brochure for Dutch Vern Back Swept Knife (No Date).

Farm Land Specialty Product Brochure for Farm Land Seed Boots, Wedge, Furrow Leveler, Mounting Bracket, Knife, Chrome Sweeps, and Key II System (No Date).

Farm Land Specialty Product Brochure for Chrome Sweeps and Key II System (No Date).

Anderson Machine, Inc. Product Brochure for The Anderson Opener (No Date).

Adams Hard–Facing Company, Inc. Product Brochure for Row Crop Sweeps, Joyce Sweeps, Field Cultivator Sweeps, Wheatland Chisel Plow Sweeps, and 600 Series Furrowers (Apr., 1988).

Farm Land Agro Supply (Red Deer) Ltd. Product Brochure for Farm Land Seed Boots, Wedge; Mounting Bracket/Knife; Harrow Leveler (No Date).

Flexi–Coil Dryland Product Book, vol. 3, for Stealth Single–ShoOt Knife and Spread Tips, Stealth Double–Shoot Side Band and Paired Row Attachments, Nok–on™ Openers, Spread Row Options of 2 to 3 Inch and 3 to 5 1/2 Inch Spread, Seeding with Weed Control with Spread Row Sweep and Sweep and Broadcast (No Date).

* cited by examiner

LOW DISTURBANCE FURROWING, SEEDING, AND FERTILIZING TOOL

FIELD OF THE INVENTION

This invention relates generally to implements for planting agricultural crops in the ground and, more particularly, to an agricultural furrowing tool for combined fertilizing and paired row seeding.

BACKGROUND OF THE INVENTION

It is commonly desirable to perform seeding and fertilizing operations in one pass over a field to be planted. This trend has continued with advancements in low-till and no-till planting implements. Ground working tools have evolved for planting in these no-till and low-till conditions for improving seed bed utilization. These tools are generally categorized as disc types or hoe types. Ground tools of both types have been developed which minimize the amount of disturbance of the ground surface when planting to avoid incorporating weed seeds into the ground that typically lay on the surface from prior years, thus preventing their germination.

Ideally, seeds are spaced evenly over an entire field. However, for practical purposes, seeds are planted in rows by ground working tools. The rows are spaced to achieve the best possible utilization of the soil area. Other factors affect row spacing, such as the need to allow field trash from prior years growth to pass between ground working tools while also arranging the ground working tools in a pattern which produces a smooth field surface. This has led to development of ground working tools which plant two rows of seed or a wide band of seed to achieve good seedbed utilization with fewer number of ground working tools and greater space between these tools thus allowing good trash flow. It is also common that these tools are designed to simultaneously place a row of fertilizer beside and below the seeds, or between the rows of seeds, thereby eliminating a need for fertilizing in a second pass and placing the fertilizer more accurately than is achievable in a separate pass.

Low disturbance hoe type tools that have been developed for combined seeding and fertilizing typically have a narrow leading blade that creates a deep furrow in which fertilizer is placed. They also include a seeding component which creates a more shallow seedbed in which a pair of seed rows or a band of seed is placed. In certain soil types and moisture conditions, the ground is badly fractured by the fertilizer blade. As a result, a seedbed that is firm and flat to establish good seed-soil contact cannot be formed. Additionally, the fractured ground may form clumps so that the seed placement and seed-soil contact are compromised with some seed being too shallow, too deep, or too close to fertilizer, which may be toxic to germinating seeds.

Another type of planting tool is known to have a standard sweep in a leading position for forming a furrow having a level or flat seedbed on which a pair of seed rows are placed, one to each side of the seedbed. The furrow is closed by soil passing over wings extending to the sides of the sweep. The tool further includes a second furrowing element comprising a rearwards angled blade for forming a second, deeper furrow between the rows of seed from 1 inch to 2.5 inches deep. A fertilizer dispensing tube is secured to the blade and also angles rearwards with the blade to dispense fertilizer into the second furrow. Designs of this type are known to cause high vertical forces in reaction to being drawn through the soil as the backswept blade forces open a deep fertilizer furrow. The total vertical reaction from many such tools attached to an implement would exceed the weight of the implement at some desirable working depths, which thus cannot be achieved. Additional weights are sometimes added to the implement to overcome this problem. Also, the location of the blade far back from the seedbed furrower is typically in a region where ground is flowing back or has flowed back to close the seedbed furrow. The ground must be displaced a second time causing more of it to be thrown beyond where it will flow back. The backswept orientation of the blade also causes ground to be thrown further laterally than narrow leading bottom point designs.

Improvements in the known prior art design are desired to include the following parameters: reduced soil disturbance compared to designs attempting similar seed and fertilizer placement; reduced draft force requirements and reduced vertical reaction force when drawing tools through the ground; improved seed and fertilizer placement; and better ground flow and furrow closure.

SUMMARY OF THE INVENTION

It is an object of this invention to overcome the aforementioned disadvantages of the prior art by providing a low disturbance furrowing, seeding, and fertilizing tool for use with agricultural crop planting implements.

It is another object of this invention to provide a narrow body for a furrowing tool.

It is a feature of this invention that the furrowing, seeding and fertilizing tool is designed in a compact configuration.

It is an advantage of this invention that the narrow body of the furrowing tool results in a low disturbance of the soil for the placement of seed in the created furrow.

It is still another object of this invention to provide a furrowing, seeding and fertilizing tool that improves the placement of seed and fertilizer into the ground for the planting of agricultural crops.

It is another feature of this invention that the fertilizer stream entering the furrowing tool is directed forwardly.

It is another advantage of this invention that the fertilizer stream is placed accurately and for improved utilization thereof by the seed that is planted in the furrow.

It is another feature of this invention that the stream of seeds entering the furrowing tool is directed forwardly.

It is another advantage of this invention that the seed stream is placed accurately to take full advantage of the accurately placed fertilizer stream within the created furrow.

It is yet another object of this invention to provide a furrowing tool for use with a planting implement that provides a low draft to allow for shallow seed and fertilizer placement.

It is still another advantage of this invention that the low draft design of the furrowing tool allows for shallow seed and fertilizer placement beneath the surface of the ground.

It is still another feature of this invention that the operation of the low draft furrowing tool preserves the seedbed on which the seed and fertilizer materials are placed.

It is a further object of this invention that the furrowing, seeding and fertilizing tool is designed with a modular construction to allow the use of the tool in a plurality of planting applications.

Forwardly directed fertilizer and seed streams provide a significant difference from known prior art furrowing tool designs and enables a compact design and accurate seed and fertilizer material placement. The resulting compact design and narrow body create a minimum of disturbance of the soil surface so that incorporation of weed seeds into the soil is reduced. A shallow indentation into the seedbed for placement of fertilizer is a minimal disruption that doesn't disturb a row of seeds spaced laterally to each side, yet confines the fertilizer for accurate separation from the seed. Draft required to pull the tool through the ground to create a furrow is also reduced, as compared with known prior art furrowing tools that place fertilizer much deeper.

Modular construction allows for other applications of the tool without the particular fertilizer furrowing component of the present invention so alternate components can be used in different planting conditions.

These and other objects, features and advantages are accomplished according to the instant invention by providing a furrowing tool for an agricultural planter which is formed in a modular configuration to provide for paired row seeding operation. The furrowing tool includes a seedbed furrowing member having an edge lying in a flat cutting plane to form a substantially flat seedbed as the furrowing tool is drawn through ground and a fertilizer furrowing member extending below the cutting plane to form an indentation in the seedbed. The seedbed furrowing member is formed with an upper surface extending rearwardly from the edge and with a void between the upper surface and the cutting plane. The furrowing tool further includes a forwardly and downwardly directed fertilizer dispensing passage to direct a stream of fertilizer at a forward direction into the indentation formed in the seed bed. The stream of seeds is also directed forwardly onto the seedbed through the void formed between the upper surface and the cutting plane. A spreader can be provided to divide the seed stream into a pair of laterally opposing streams onto the seedbed. The seedbed furrowing member and the spreader can be formed as a modular component separate from the fertilizer furrowing member.

BRIEF DESCRIPTION OF DRAWINGS

The advantages of this invention will be apparent upon consideration of the following detailed disclosure of the invention, especially when taken in conjunction with the accompanying drawings wherein.

DETAILED DESCRIPTION OF PREFERRED EMBODIMENTS

Figure 7:
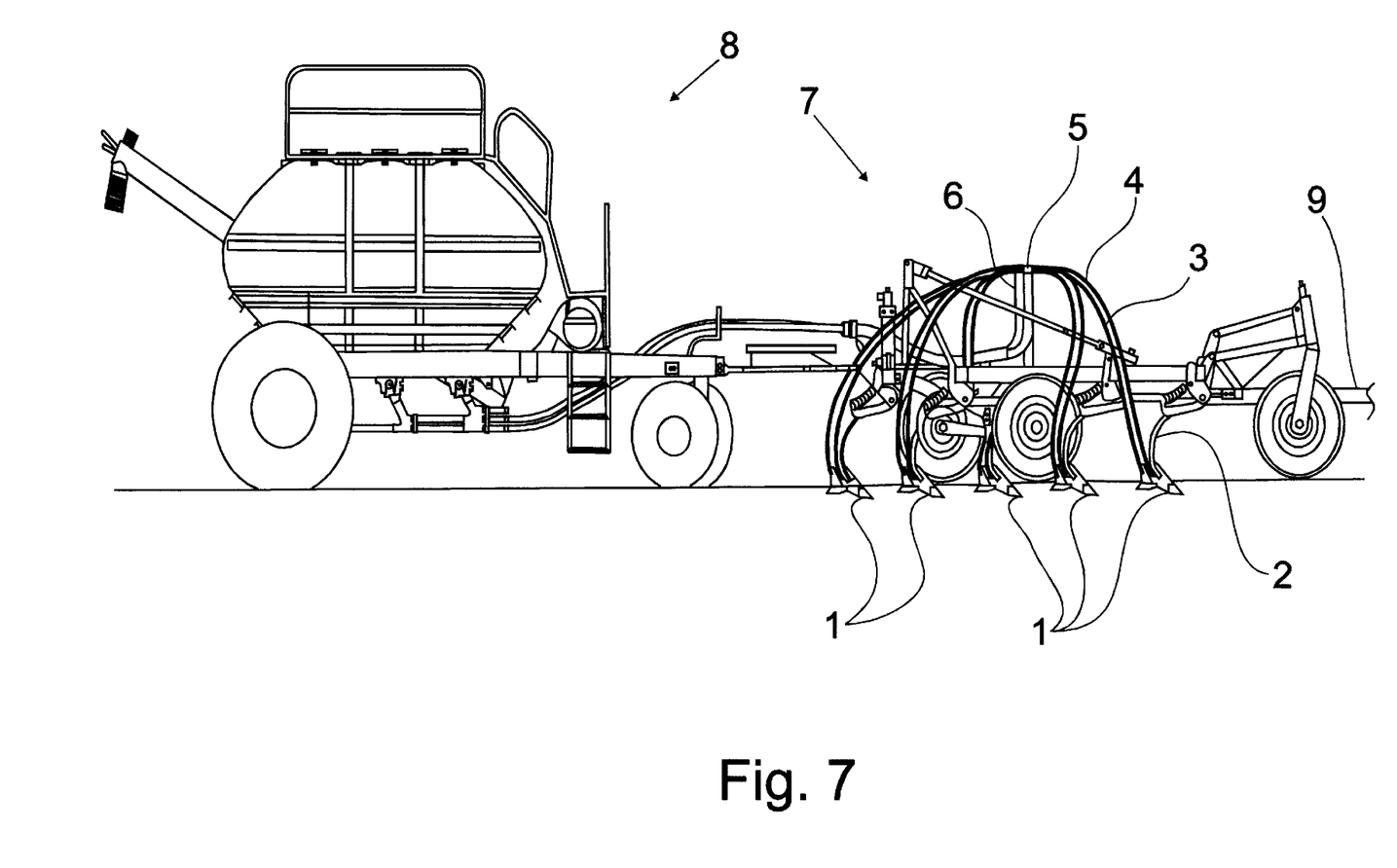
FIG. 7 is a side elevational view of an air seeder with a planting mechanism attached thereto on which a furrowing tool incorporating the principles of the instant invention may be utilized.

An agricultural furrowing tool 1 includes a mounting portion 14 for securing to a shank 2 as shown in FIG. 7. A plurality of furrowing tools 1 and shanks 2 are typically attached to a tillage implement 7 to fore and aft spaced toolbars. The spaced arrangement is selected to allow the best passage of field trash between adjacent tools yet minimize buildup of soil ridges. Three to five toolbars are typically provided depending on the spacing desired between planted rows. The implement 7 includes a hitch 9 by which it can be pulled across a field. A product cart 8 can be pulled behind the tillage implement 7 as shown in FIG. 7 or alternately the tillage implement 7 can be bulled behind a product cart. The cart 8 delivers seed to the furrowing tool 1 through seed headers 5 and seed lines 4 and fertilizer through fertilizer headers 6 and fertilizer lines 3.

Figure 1:
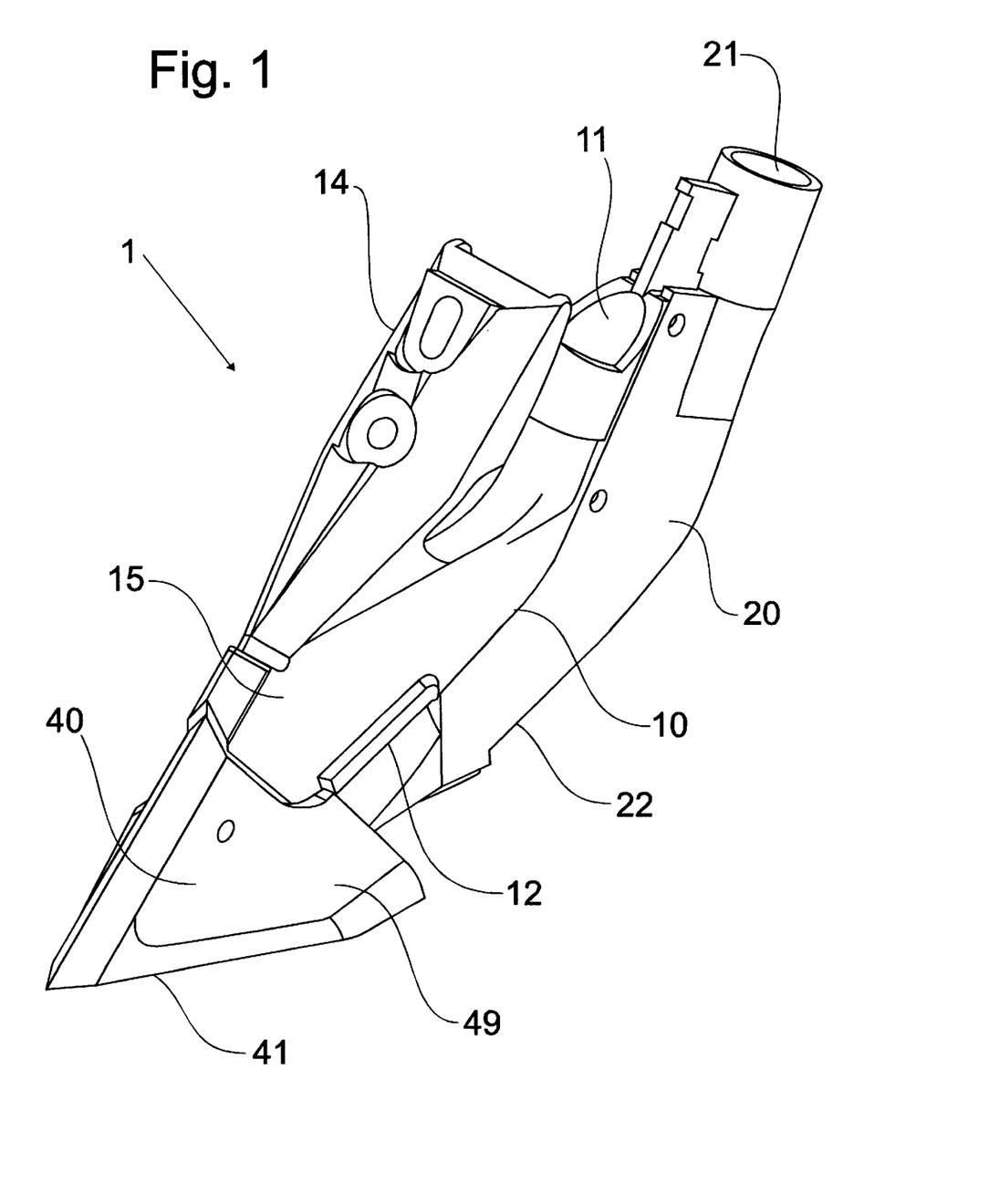
FIG. 1 is a perspective view of a furrowing tool for paired row seeding and fertilizing incorporating the principles of the instant invention.

As seen in FIG. 1 the furrowing tool 1 comprises of a main tool body 10 which include a narrow body 15 from which a mounting portion 14 extends upwardly and is adapted with a widened section having mounting holes for securing the main body 10 to a shank 2. The main body includes a seed dispensing passage having a seed inlet 11 and a seed outlet 12. In an operating orientation material such as a seed stream entering the seed inlet 11 moves downward and forward to the seed outlet 12 to exit with a downward and forward direction. The main body is adapted with tabs having holes for fastening modular components.

A seedbed furrowing component 40 is securable to the main tool body 10 by a fastener 61. The seedbed furrowing component 40 is known in the art as a sweep. It is of a specialized type which has a narrow upper portion for adapting to mount flush with the narrow body 15 of the main tool body 10. It has wing members 49 which extend to lateral sides of the narrow upper portion. It also has a leading edge 41 which extends laterally and rearwards from the front end of the seedbed furrowing component 40 and along each side to a rear end 48. On the bottom side of the seedbed furrowing component is a bottom surface 42 that extends rearwards and inwards from the leading edge 41. A void 43 exists within a portion of the bottom side of the seedbed furrowing component and is constrained at the top by an upper void surface 44 which is also the underside of wings 49. A spreader member 47 is situated within the void 43 and has a central ridge 46. The ridge 46 extends downward and rearward from the upper void surface 44. Spreader surfaces 45 extend forward and laterally from the ridge 46, and also angle downwards and laterally from the upper void surface.

The component 40 typically operates with the leading edge from 0.5 inches to 4 inches below the surface of the ground. Ground is cut by the edge 41 to form a seedbed and the cut soil flows up over the wings 49. The ground surface is penetrated by the upper narrow portion of the component 40 which slices through the ground with minimal disturbance. This portion is the same thickness as the narrow body 15 of the main tool body 10 so the ground flows past flush fitted components.

In operation, the seedbed furrowing tool 40 is oriented so the leading edge lies in a cutting plane 50 which is aligned with a direction of travel of the tool 40 as it is drawn through the ground. The seedbed furrowing tool cuts an even and smooth seedbed in the previously undisturbed ground. Part of the material stream which exits from the seed outlet 12 and is directed to the spreader 47 and part is directed down behind the spreader 47. The ridge 46 is aligned with the center of the seed outlet 12 so that the part of the material stream contacting it is deflected laterally to each side. The spreader does not extend completely to the cutting plane 50 so the seedbed is not disturbed by it. Without additional components or members in place, the material stream becomes generally evenly spread in a band within the void area 43 below and to the lateral extents of the upper void surface 44.

Figure 2A:
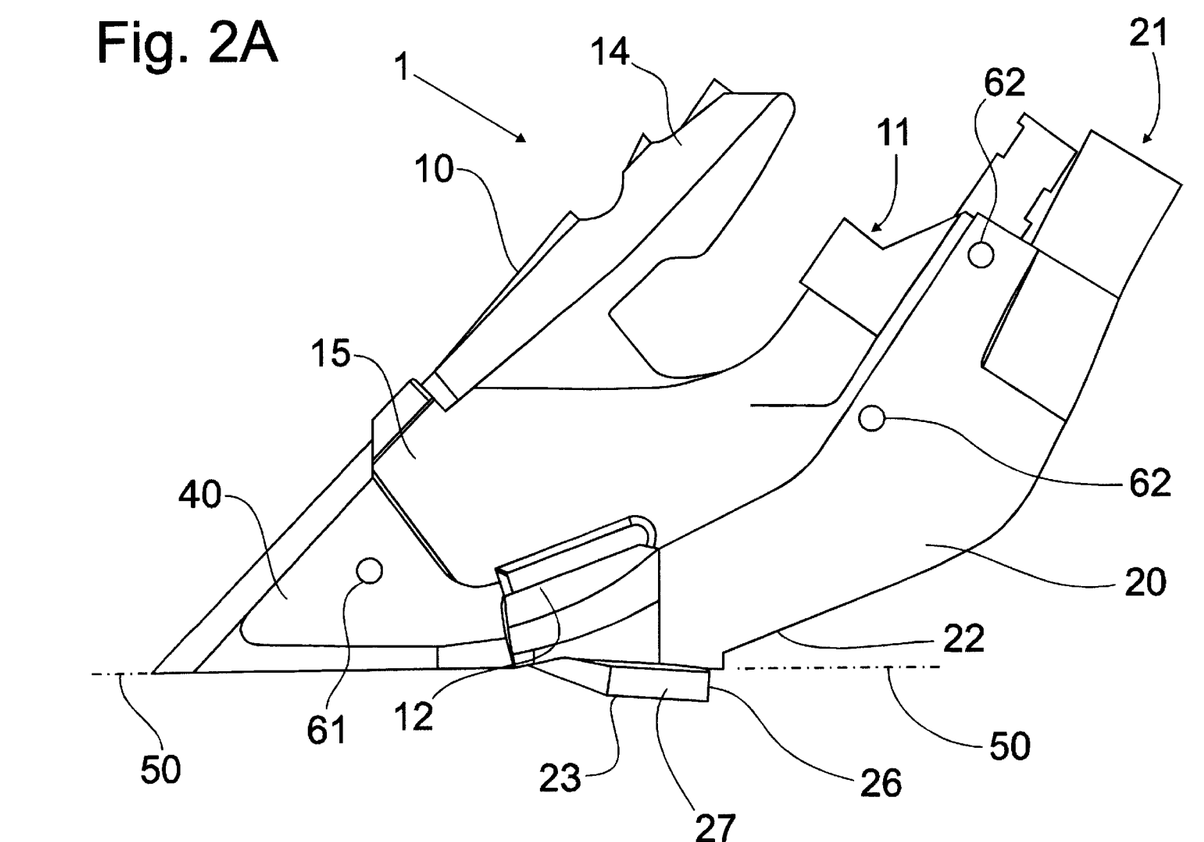
FIG. 2A is a side elevational view of the furrowing tool shown in FIG. 1.
Figure 2B:
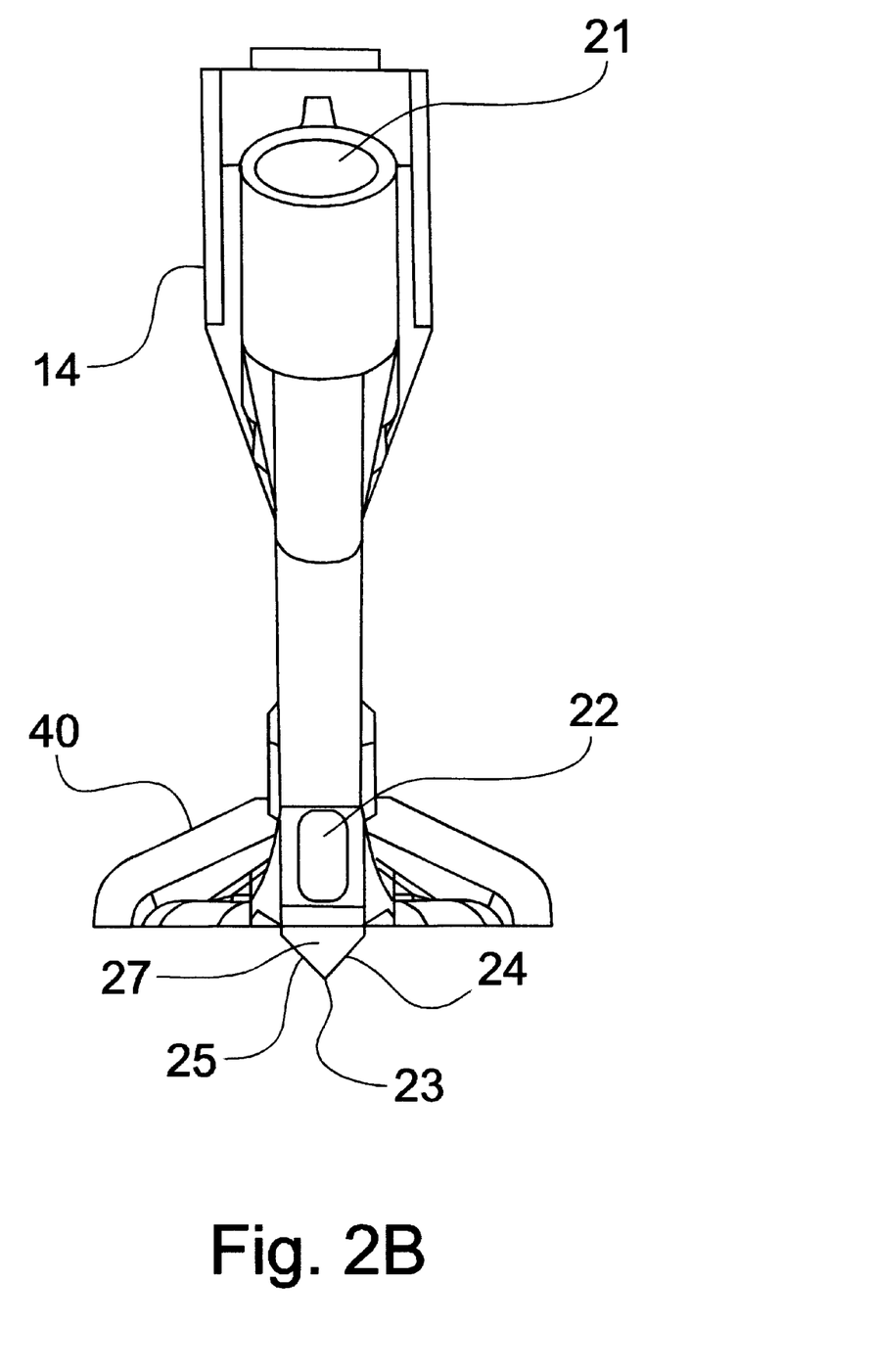
FIG. 2B is a rear elevational view of the furrowing tool shown in FIG. 1.
Figure 3:
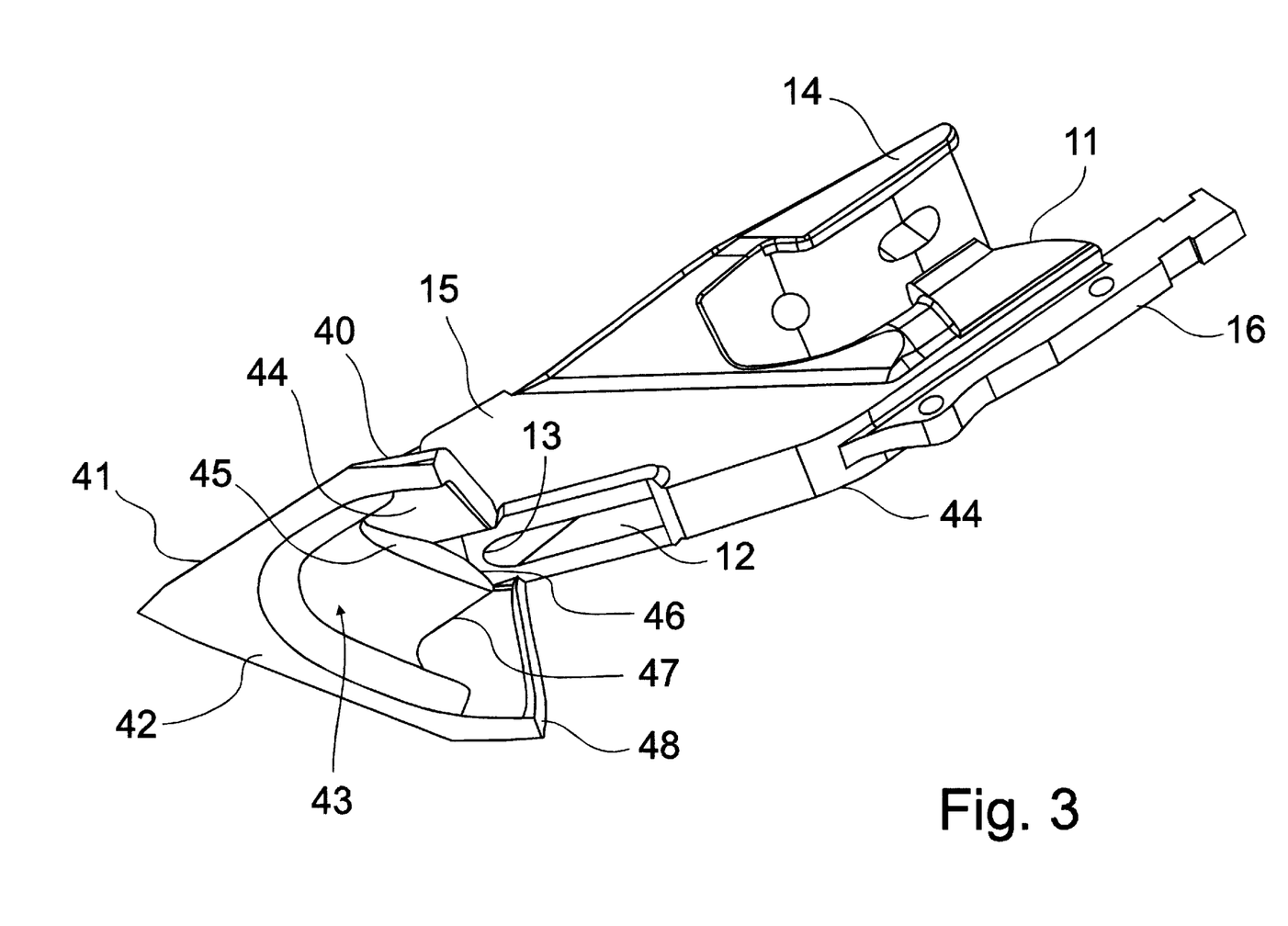
FIG. 3 is a bottom perspective view of a furrowing tool for seeding, taken from a lower, left perspective.
Figure 4:
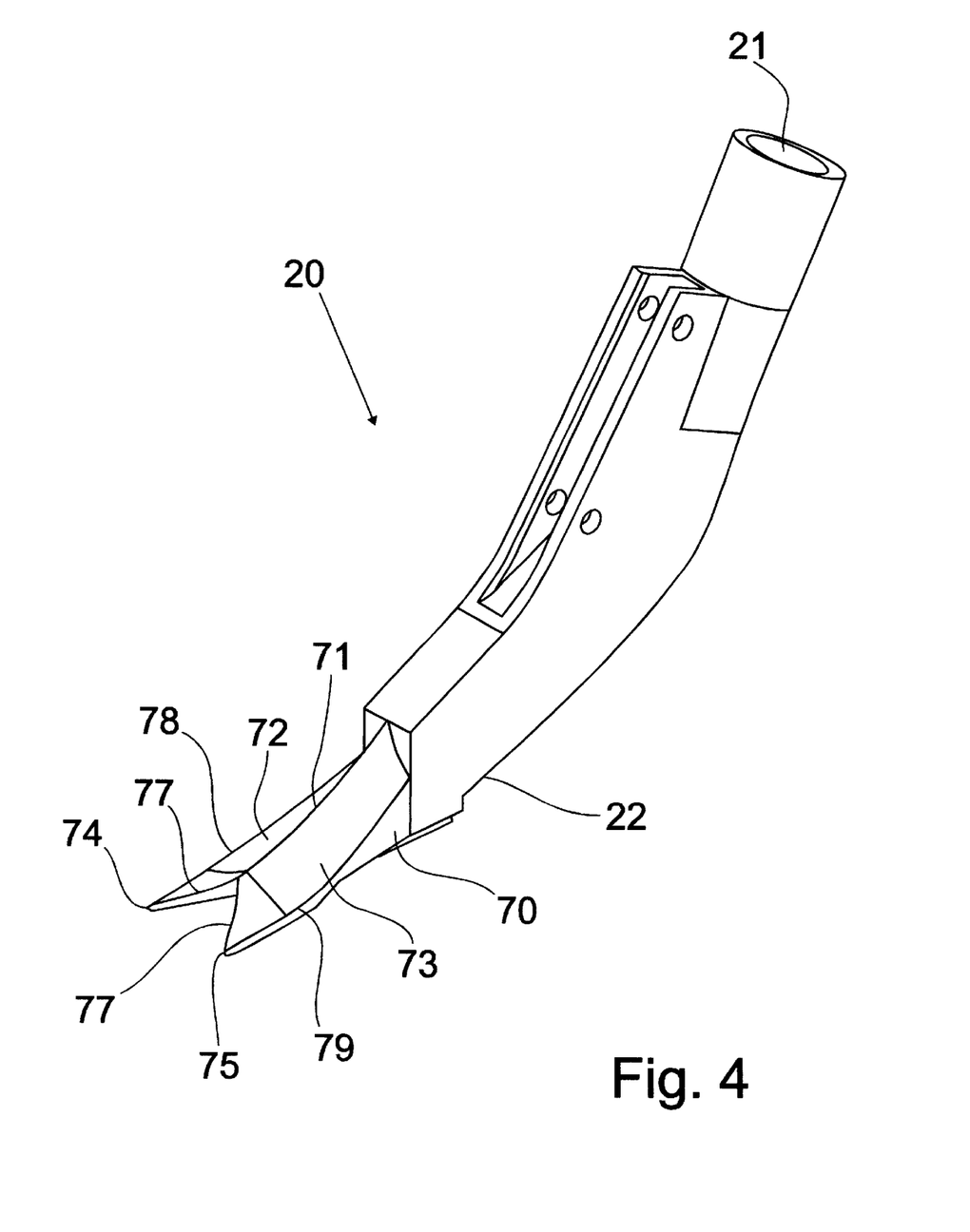
FIG. 4 is a perspective view of a furrowing tool modular component.
Figure 5A:
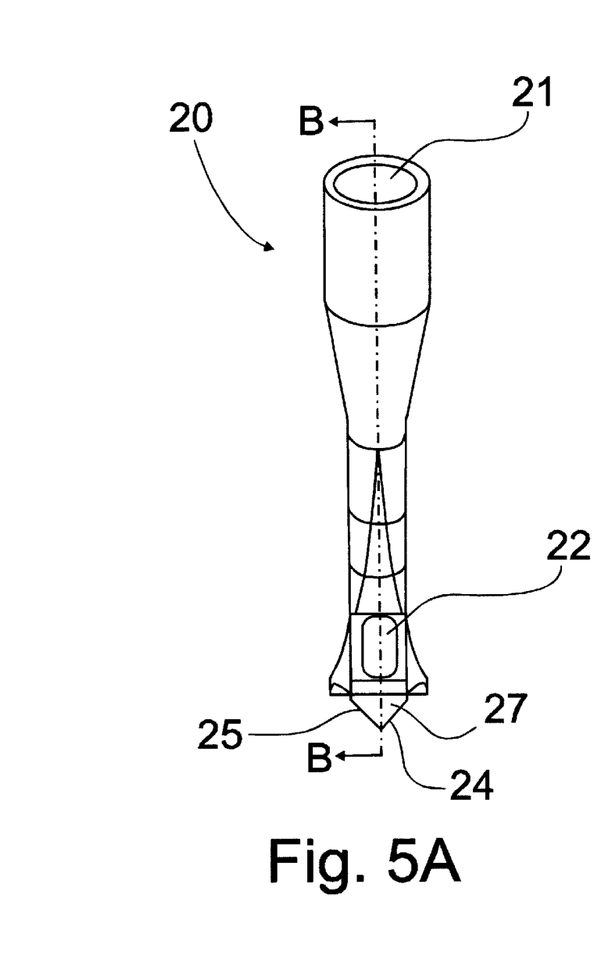
FIG. 5A is a rear view of the furrowing tool modular component shown in FIG. 4.
Figure 5B:
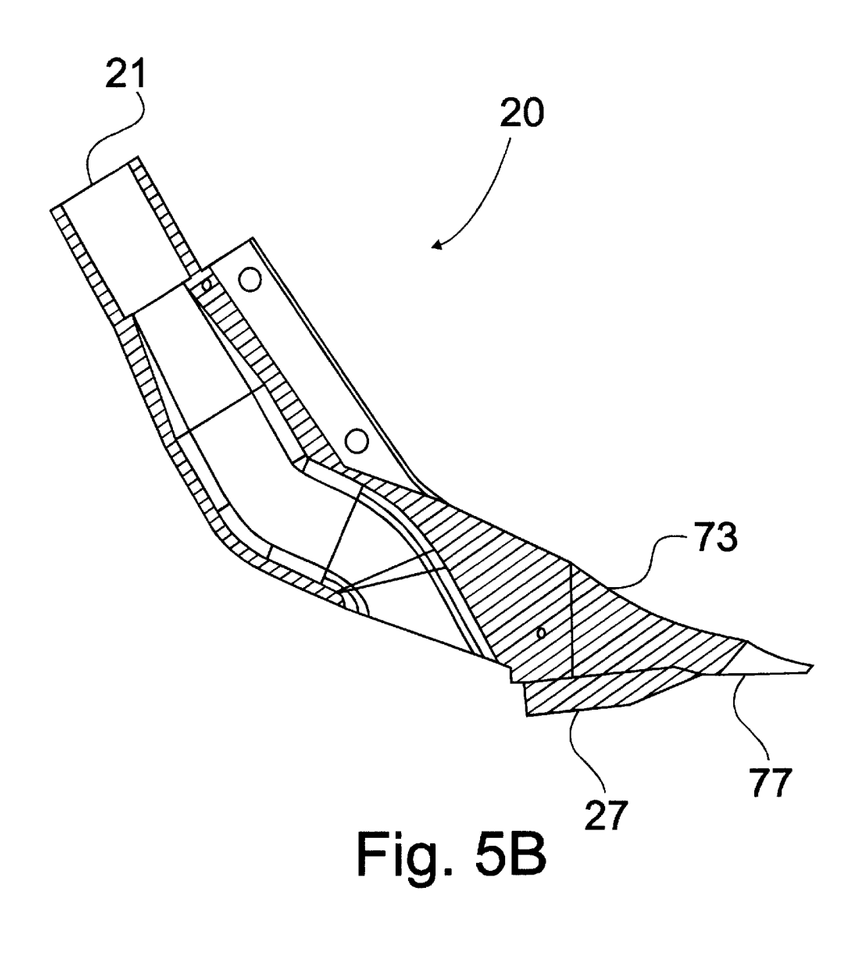
FIG. 5B is a cross-sectional view of the furrowing tool modular component taken along lines B—B of FIG. 5A.
Figures 6A, 6B:
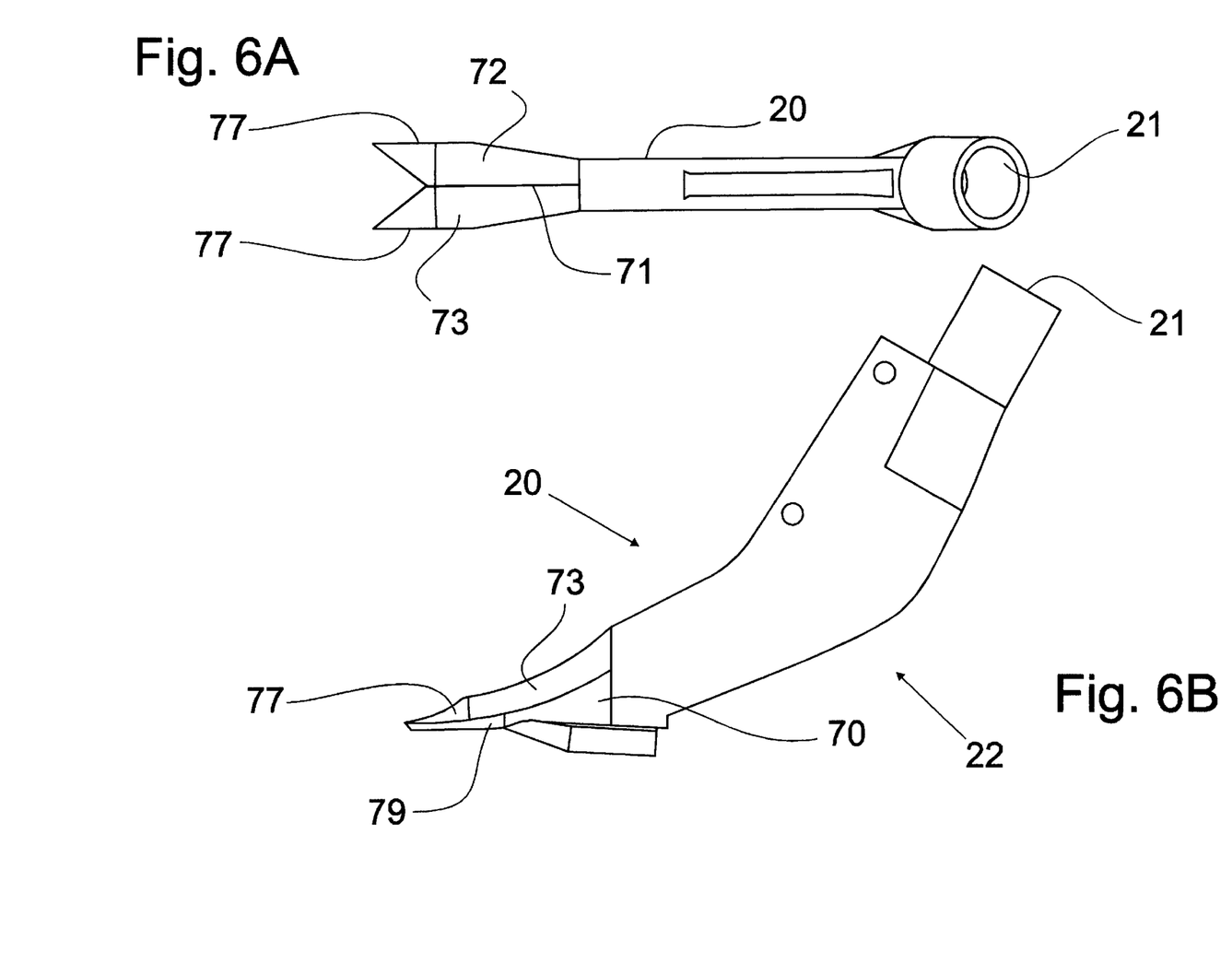
FIG. 6A is a top plan view of the furrowing tool modular component shown in FIG. 4.
FIG. 6B is a side elevational view of the furrowing tool modular component shown in FIG. 4.
Figure 6C:
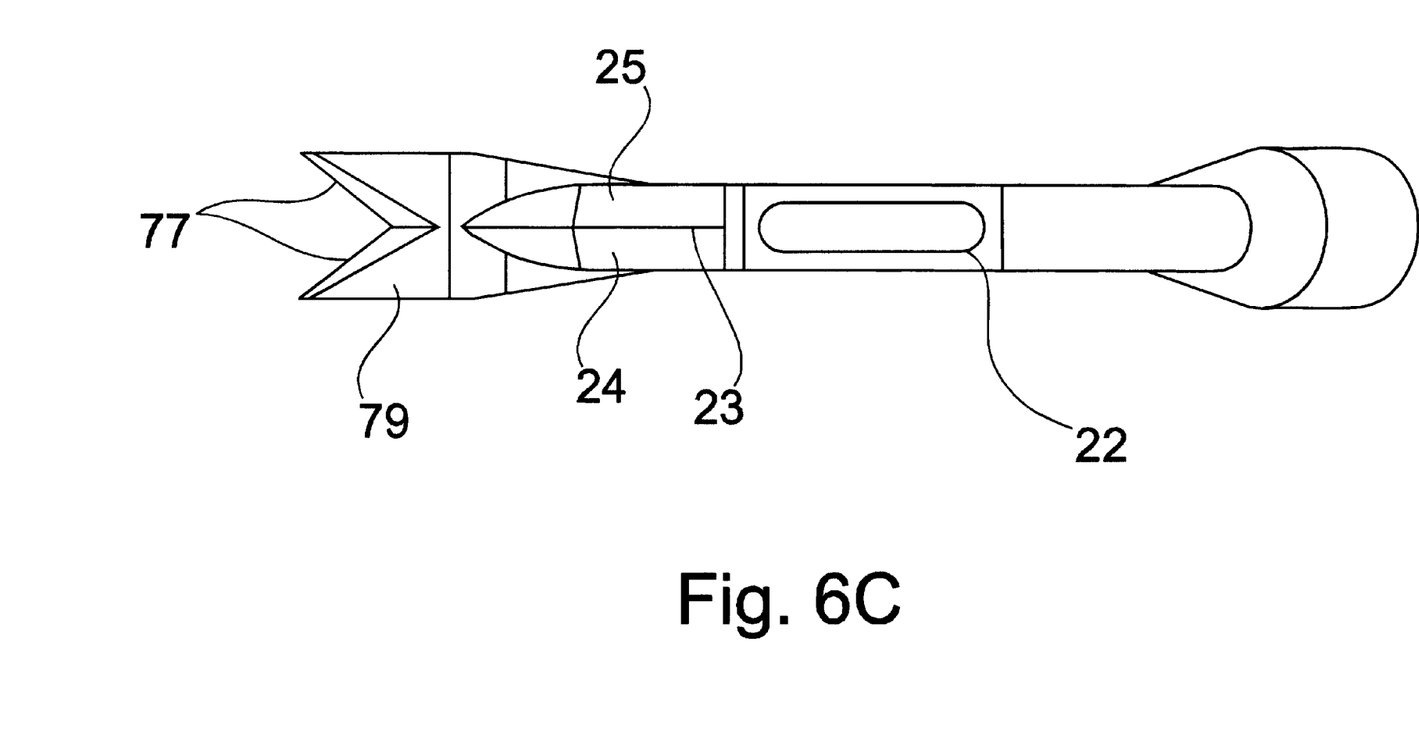
FIG. 6C is a bottom plan view of the furrowing tool modular component depicted in FIG. 4.

A fertilizer furrowing component 20 is securable to the main tool body 10 by fasteners 62. As can be seen in FIG. 1, FIG. 2, and FIG. 5B, the fertilizer component 20 includes a fertilizer dispensing passage having a fertilizer inlet 21 and a fertilizer outlet 22. In an operating orientation, material such as a fertilizer stream entering the fertilizer inlet 21 moves downward and forward to the fertilizer outlet 22 to exit with a downward and forward direction. The fertilizer component includes a fertilizer furrowing member 27 which has a V shape as seen in a rear profile in FIG. 2B. It is located at a lower end of the fertilizer component 20 and has side surfaces 24 and 25 which taper downward and inward to a bottom edge 23. It terminates at a rear end 26.

In operating orientation, the furrowing member bottom edge 23 extends 0.5 inches below the cutting plane 50 to make a V shaped indentation in the seedbed which had been created by the seedbed furrowing tool 40. The material stream which is dispensed from the fertilizer outlet 22 is directed forward and downward falls into the indentation directly behind the furrowing member rear end 26. The V shape of the indentation assists in confining the dispensed material within the indention to keep it separate from material dispensed by the seed outlet 12. Ground that had been displaced by the seedbed furrowing member 40 begins to flow back over the seedbed after the rear end 48 passes by. At typical speeds at which the furrowing tool is drawn through the ground, the ground does not close in over the center of the seedbed until 6 or more inches to the rear of the wing rear ends 48. By this point, the material dispensed from the fertilizer outlet is in place and the fertilizer furrowing member 27 does not obstruct ground flowing over and covering the seedbed and fertilizer furrows.

A preferable compact furrowing tool assembly is achieved having the seed outlet front end 13 positioned behind the seedbed furrowing tool 10 at about the same fore to aft location as the wing rear ends 48. The preferable compact tool also has the fertilizer furrowing member 27 located such that the rear end 26 terminates within 4 inches to the rear of a seed outlet front end 13. For some operators, a satisfactory tool will have a fertilizer furrowing component extending up to 6 inches behind the seed outlet front end 13. A more rearwardly positioned fertilizer furrowing member would need to reopen the closed seedbed furrow and thus would tend to cause seedbed disturbance and additional displacement of ground laterally from the furrow. More rearwardly placed fertilizer furrowers are known to have backswept blades which tend more to blast the ground away from the furrow to an extent that it does not flow back again. The forward and downward direction with which the material is dispensed from the fertilizer outlet 22 provides for a more compact design and greater accuracy in placing the material.

A second spreader member 70 extends to a forward end of the furrowing component 20 so that in an assembled format it extends up to the spreader surfaces 45 of the first spreader member 47. It has a fork shaped end with two prongs having inner edges 77 tapering inward from the two prongs ends 74 and 75 to intersect centrally. A ridge 71 extends rearward of the intersection of the prong edges 77. In assembled format the prong edges 77 mate with the spread surfaces 45 with ridge 46 of the first spreader 47 positioned between the prongs and aligned with the second spreader ridge 71. In operating orientation, the seed outlet generally lies in a plane transverse to a direction of travel and angled upward and rearward about 25 degrees. The aft end of the second spreader member 70 terminates adjacent the aft end of the seed outlet 12. The center ridge 71 extends from the aft end of the spreader 70 downward and forward at about 45 degrees, arcing more forwardly at its forward end where it is about 15 degrees inclined to the rear.

Spreader surfaces 72 and 73 are arced downwardly and laterally from the ridge 71 to lateral sides 78 and 79. At the aft end of the spreader member 70, the spreader surfaces 72 and 73 begin from the ridge 71 steeply at about 75 degrees downward and laterally from the ridge 71 and are gradually angled less to the forward end where they begin at about 30 degrees from the ridge 71. Material in a stream dispensed from the seed outlet 12 that contacts the second spreader 70 is directed froward and laterally. In assembled format, a confinement space is contained between each spreader surface 72, 73 and the upper void surface 44. The confinement space defined above preferably has a dimension of not less than 0.5 inches between the void surface and each second spreader member surfaces 72 and 73 so that seeds as large as peas will pass through without plugging. Much of the material stream from the seed outlet 12 is directed at the first spreader surfaces 46 and 47 to be divided and directed more laterally into 2 separate rows. Ground that flows over the seedbed furrower wings 49 creates an extension of the void 43. Any material of the stream from the seed outlet 12 that is not directed at the first spreader surfaces 46 and 47 is divided by the second spreader surfaces 72 and 73 and contained below the extended void 43 to be confined to the 2 separate rows.

The second spreader member 70 is about 1.5 inches wide between sides 78 and 79 at the prong ends 74 and 75 and tapers rearwards to a main body of the fertilizer furrowing component where it is about 1 inch wide or less. The main body of the fertilizer furrowing component thus mates flush with the narrow body 15 of the furrowing tool 1.

The combined spreader members extend completely below the seed outlet 12 between its fore and aft ends. Preferably the spreader members are constructed so that the first spreader member remains functional independent of the second spreader member for operating as a broad band full spread device. In such operation, material from the seed outlet 12 is not confined into separate rows.

Preferably the furrowing tool 1 is made of an assembly of modular components including a furrowing tool 40 and a fertilizer furrowing component 20. However, it is apparent that a tool dedicated to operating only as does the preferred assembly could be constructed as a unitary component having member portions like those of the preferred modular components or with only a replaceable leading component or only a detachable fertilizer component having the inventive characteristics.

Material delivery passages have been described above as for seed and fertilizer, but it is understood that other combinations of materials can be planted into the ground with a tool of this design such as dispensing pesticide or herbicide in place of the fertilizer stream or alternating seed and fertilizer streams, although the best known mode of operation is with planting paired seed rows. Those skilled in the art may recognize other modifications from the preferred embodiments that may be made without departing from the spirit and scope of the invention.

Having thus described the invention, what is claimed is:

1. An agricultural furrowing tool for paired row seeding comprising:

a seedbed furrowing member having an edge which lies generally in a flat cutting plane so in operation it forms a substantially flat seedbed as the furrowing tool is drawn through ground, an upper surface extending rearwards from said edge, and a void between said upper surface and said cutting plane;

a fertilizer furrowing member extending below said cutting plane so when operating forms an indentation in said seedbed; and a forwardly and downwardly directed fertilizer dispensing passage leading from a fertilizer inlet to a fertilizer outlet so in operation a stream of fertilizer is directed from said fertilizer outlet with a forward direction into said indentation.

2. The furrowing tool of claim 1 further comprising:

a seed inlet and a seed outlet arranged so that material dispensed from the seed outlet is directed downwardly and forwardly to said void.

3. The furrowing tool of claim 2 wherein a bottom end of the fertilizer furrowing member extends below said cutting plane and is V-shaped in a rear profile.

4. The furrowing tool of claim 2 in which a bottom end of the fertilizer furrowing member extends below said cutting plane and has a rearward end which terminates proximate to a front end of said seed outlet.

5. The furrowing tool of claim 2 further comprising:

a mounting portion for adapting to a mounting shank and a body portion more narrow in a rear profile than the mounting portion extending between the mounting portion and seedbed furrowing member.

6. The furrowing tool of claim 1 in which the seedbed furrowing member is a modular component formed as an assembly of said furrowing tool.

7. The furrowing tool of claim 6 wherein the fertilizer furrowing member and fertilizer dispensing passage are formed as a modular component assembly of said furrowing tool.

8. An agricultural furrowing tool for paired row seeding comprising: a seedbed furrowing member having an edge which lies generally in a flat cutting plane so in operation it forms a substantially flat seedbed as the furrowing tool is drawn through ground, an upper surface extending rearwards from said edge, and a void between said upper surface and said cutting plane;

a fertilizer furrowing member extending below said cutting plane so when operating forms an indentation in said seedbed;

a forwardly and downwardly directed fertilizer dispensing passage leading from a fertilizer inlet to a fertilizer outlet so in operation a stream of fertilizer is directed from said fertilizer outlet with a forward direction into said indentation;

a seed inlet and a seed outlet arranged so that material dispensed from the seed outlet is directed downwardly and forwardly to said void; and a first spreader member extending below the seed outlet and being generally centrally aligned fore and aft with the seed outlet to be operable to separate a stream of seed flowing from said seed outlet into a pair of laterally spaced streams.

9. The furrowing tool of claim 8, further including a second spreader member extending below the seed outlet from said first spreader member, said second spreader member having an end which mates with a corresponding end of the first spreader member.

10. The furrowing tool of claim 9 in which each said spreader member has a central ridge aligned in a fore and aft direction and a spreader surface extending from the ridge to each lateral side of the respective spreader member.

11. The furrowing tool of claim 10 wherein said second spreader member includes a forked ending having two prongs which mate with the ridge and surfaces of said first spreader member.

12. A modular agricultural furrowing tool comprising:

a mounting member adapted for attachment to a frame member of an agricultural planter;

a seedbed furrowing member detachably connected to said mounting member, said seedbed furrowing member having laterally extending wings cooperable with a seed dispensing tube to receive a supply of seed from said agricultural planter and operable to place said seeds in a plane extending laterally to both sides of a transverse center of said seedbed furrowing member; and a fertilizer furrowing member detachably connected to said mounting member generally centrally of said seedbed furrowing member and being adapted to form an indentation in a seedbed generally centrally of said tool, said fertilizer furrowing member being cooperable with a fertilizer dispensing tube to receive a stream of fertilizer from said agricultural planter for placement in the ground in said indentation.

13. The furrowing tool of claim 12 further comprising a spreader member extending from one end of the tool.

14. The furrowing tool of claim 13 wherein the spreader member includes a forked ending having two prongs and a central ridge aligned in a fore and aft direction with the spreader member, said spreader member having a spreader surface extending laterally from the ridge to each lateral side.

15. The furrowing tool of claim 12 wherein a bottom end of the fertilizer furrowing member is V-shaped in a rear profile, said indentation extending to a depth below said plane of said seed placement for the placement of said fertilizer in the ground below the plane of said seeds.

* * * * *

UNITED STATES PATENT AND TRADEMARK OFFICE
CERTIFICATE OF CORRECTION

PATENT NO. : 6,405,665 B1
DATED : June 18, 2002
INVENTOR(S) : Henry et al.

It is certified that error appears in the above-identified patent and that said Letters Patent is hereby corrected as shown below:

<u>Title page,</u>
Item [75], line 3 thereof should be corrected to read as follows:
-- Wiebe, Warman, all of (CA) --

Signed and Sealed this

Twenty-second Day of July, 2003

JAMES E. ROGAN
*Director of the United States Patent and Trademark Office*